US006260015B1

(12) United States Patent
Wang et al.

(10) Patent No.: US 6,260,015 B1
(45) Date of Patent: Jul. 10, 2001

(54) METHOD AND INTERFACE FOR CORRECTING SPEECH RECOGNITION ERRORS FOR CHARACTER LANGUAGES

(75) Inventors: Huifang Wang, West Palm Beach; Ronald VanBuskirk, Indiantown; James R. Lewis, Delray Beach; Oing Gong, West Palm Beach, all of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/146,177

(22) Filed: Sep. 3, 1998

(51) Int. Cl.[7] .............................. G10L 15/18; G10L 21/06
(52) U.S. Cl. ............................. 704/257; 704/276
(58) Field of Search ..................... 382/181, 182, 382/185, 187, 229; 704/235, 257, 276

(56) References Cited

U.S. PATENT DOCUMENTS

| | | | | |
|---|---|---|---|---|
| 4,926,491 | * | 5/1990 | Maeda et al. | 382/155 |
| 5,163,111 | * | 11/1992 | Baji et al. | 706/20 |
| 5,220,639 | * | 6/1993 | Lee | 704/200 |
| 5,426,745 | * | 6/1995 | Baji et al. | 345/469 |
| 5,602,960 | * | 2/1997 | Hon et al. | 704/207 |
| 5,687,333 | * | 11/1997 | Dobashi et al. | 345/336 |
| 5,699,455 | * | 12/1997 | Arai et al. | 382/187 |
| 5,777,614 | * | 7/1998 | Ando et al. | 345/333 |
| 5,787,230 | * | 7/1998 | Lee | 704/235 |
| 5,841,901 | * | 11/1998 | Arai et al. | 382/187 |
| 5,878,274 | * | 3/1999 | Kono et al. | 710/8 |
| 5,953,693 | * | 9/1999 | Sakiyama et al. | 704/3 |
| 6,005,549 | * | 12/1999 | Forest | 345/157 |

OTHER PUBLICATIONS

Lin et al,"On–line recognition of handwitten Chinese characters and alphabets", ICASSP 90, Apr. 1990.*
Lee, "Golden Mandarin (II)—an intelligent Mandarin dictation machine for chinese character input with adaptation/ learning functions", ISSIPNN 1994, Apr. 1990.*

* cited by examiner

*Primary Examiner*—Fan Tsang
*Assistant Examiner*—Michael N. Opsasnick
(74) *Attorney, Agent, or Firm*—Akerman Senterfitt

(57) ABSTRACT

A method for correcting errors of a speech recognition application in natural speech recognition of words or phrases represented by characters can include the steps of selecting a character corresponding to an incorrectly recognized spoken word or phrase and observing a list of alternative characters. The method also can include replacing the incorrect character with one of the alternative characters, if the alternative characters correctly represent the incorrectly recognized word or phrase. If none of the alternative characters in the list correctly represents the spoken word or phrase, the step of drawing some features of a character correctly representing the incorrectly recognized word or phrase by moving a cursor can be included. Also included in the method can be the step of updating the list of alternative characters responsive to the drawing step; and, repeating the replacing, drawing and updating steps until a character correctly representing the word or phrase is selected from the updated list. A graphical user interface can respond to keyboard, mouse and voice commands.

28 Claims, 3 Drawing Sheets

METHOD AND INTERFACE FOR CORRECTING SPEECH RECOGNITION ERRORS FOR CHARACTER LANGUAGES

BACKGROUND OF THE INVENTION

1. Field of the Invention

This invention relates to the field of correcting errors in natural speech recognition applications, and in particular, to correcting natural speech recognition errors in languages in which words and phrases are represented by characters instead of groups of letters.

2. Description of Related Art

Many languages, such as Chinese and other Asian languages, are based on written characters to represent words or phrases, rather than groups of letters. It is very difficult and time consuming to manually enter the characters of such languages into a computer. Even knowing that each character represents a word or phrase in its entirety, it is often shocking to learn, for example, that there are over 7,000 Chinese characters. In order to use a standard keyboard with less than 100 keys, operators must go through a great deal of practice and training.

Speech recognition is an extremely fast method of entering Chinese characters. It is much faster than typing or using handwriting recognition.

Unfortunately, speech recognition in any language is not 100% accurate. Mistakes are made that must be corrected. Moreover, unless the mistakes are corrected according to the rules of the speech application, the speech application will not be self-correcting for future dictation. Correction is that much more difficult in character based languages. If a user is forced to correct speech recognition errors using a standard keyboard the effectiveness of speech recognition is reduced because the user still has to learn how to enter Chinese characters, or the characters of other languages, using a keyboard and/or mouse.

Presently, in Chinese and other Asian languages, it is difficult to correct speech recognition errors with a keyboard and mouse. This method describes a natural, user interface that will allow users to easily and naturally use speech recognition with a standard computer without purchasing an extra equipment or going through a great deal of training.

There is a long felt and unsatisfied need to enable efficient and convenient correction of characters with a standard keyboard and mouse, that is, by standard cursor controls.

SUMMARY OF THE INVENTION

In accordance with the inventive arrangements, a graphical user interface (GUI) allows a user to correct speech recognition errors naturally, and does not require extensive training. The GUI reflects the complementary technologies of speech and handwriting recognition technology. Characters can be "written" into a portion of the GUI, in whole or in part, by the standard cursor controls provided by a standard keyboard and mouse.

A method for correcting errors of a speech recognition application in natural speech recognition of words or phrases represented by characters, in accordance with an inventive arrangements, comprises the steps of: selecting a character corresponding to an incorrectly recognized spoken word or phrase; observing a list of alternative characters; replacing the incorrect character with one of the alternative characters, if the one of the alternative characters correctly represents the incorrectly recognized word or phrase; and, drawing at least some features of a character correctly representing the incorrectly recognized word or phrase by moving a cursor, if none of the alternative characters in the list correctly represents the spoken word or phrase.

The method can further comprise the step of updating the list of alternative characters responsive to the drawing step.

The updating step can comprise the steps of: filtering a comprehensive list of the characters based on the drawing step; regenerating the list of alternative characters based on the filtering step; and, repeating the observing and replacing steps. As necessary, the method further comprises the steps of: repeating the drawing step if none of the alternative characters in the regenerated list correctly represents the spoken word or phrase; and, repeating the filtering, regenerating, observing and replacing steps.

Advantageously, the drawing step can comprise the steps of: selecting at least one predrawn character feature from a list of the features; and, pasting the at least one selected feature into at least one of a plurality of predefined zones by which the characters are defined.

The method can further comprise the step of updating the list of alternative characters responsive to the selecting and pasting steps.

The updating step can comprise the steps of: filtering a comprehensive list of the characters based on the selecting and pasting steps; regenerating the list of alternative characters based on the filtering step; and, repeating the observing and replacing steps. As necessary, the method can further comprise the steps of: repeating the selecting and pasting steps if none of the alternative characters in the regenerated list correctly represents the spoken word or phrase; and, repeating the filtering, regenerating, observing and replacing steps.

The method can also further comprise the steps of: displaying the list in a first part of a graphical user interface (GUI) of the speech recognition application; and, drawing the at least some features in a second part of the GUI. The appearance of the cursor can be changed at least within the second part of the GUI. The updating step can be initiated automatically when the cursor is moved out of the second part of the GUI.

A method for correcting errors of a speech recognition application in natural speech recognition of words or phrases represented by characters, in accordance with another inventive arrangement, comprises the steps of: selecting a character corresponding to an incorrectly recognized spoken word or phrase; observing a list of alternative characters; replacing the incorrect character with one of the alternative characters, if the one of the alternative characters correctly represents the incorrectly recognized word or phrase; drawing at least some features of a character correctly representing the incorrectly recognized word or phrase by moving a cursor, if none of the alternative characters in the list correctly represents the spoken word or phrase; updating the list of alternative characters responsive to the drawing step; and, repeating the replacing, drawing and updating steps until a character correctly representing the word or phrase is selected from the updated list The updating step can comprise the steps of: filtering a comprehensive list of the characters based on the drawing step; and, regenerating the list of alternative characters based on the filtering step.

The drawing step can advantageously comprise the steps of: selecting at least one predrawn character feature from a list of the features; and, pasting the at least one selected feature into at least one of a plurality of predefined zones by which the characters are defined.

The method can further comprise the steps of: displaying the list in a first part of a graphical user interface (GUI) of the speech recognition application; selecting the at least one predrawn character from a second part of the GUI; and, pasting the at least one feature into a third part of the GUI. The appearance of the cursor can be changed at least within the third part of the GUI. The updating step can initiated automatically when the cursor is moved out of the third part of the GUI.

A graphical user interface (GUI), embodied in a programmed routine set of instructions for correcting errors of a speech o recognition application in natural speech recognition of words or phrases represented by characters, in accordance with yet another inventive arrangement, comprises: a first section for displaying a list of alternative characters for replacing incorrect characters; a second section for drawing at least some features of a character correctly representing said incorrectly recognized word or phrase by moving a cursor; means for providing a cursor with different appearances in said first and second sections respectively; and, means for initiating regeneration and redisplay of said list responsive to information drawn in said second section.

The GUI can comprise a third section for displaying a list of character features which can be selected and pasted into said second section. The second section can be divided into a plurality of zones into which said selected character features can be pasted.

The initiating means can comprise an activatable icon displayed on said GUI, or the initiating means can be responsive to movement of said cursor out of said second section, or both.

DETAILED DESCRIPTION OF THE PREFERRED EMBODIMENTS

Speech recognition in a character language proceeds in a manner similar to letter group languages, namely a user dictates into the speech application and a series of characters are identified and appear on a graphical user interface. Incorrect characters can be flagged by proofreading, in accordance with a number of known techniques. In some cases, the speech application will flag characters having an insufficient probability of being correct. As proof reading proceeds, a list of possible alternatives generated by the speech application are presented and the user can easily select an alternative from the list. In a letter group language, if all normal procedures fail, it is easy to simply type the correct word. In a character based language, the correct "word" is actually a complex character comprising many parts. Typing such a character has not been simple in any respect, and in previous applications, has required sophisticated drawing applications.

Figure 1:
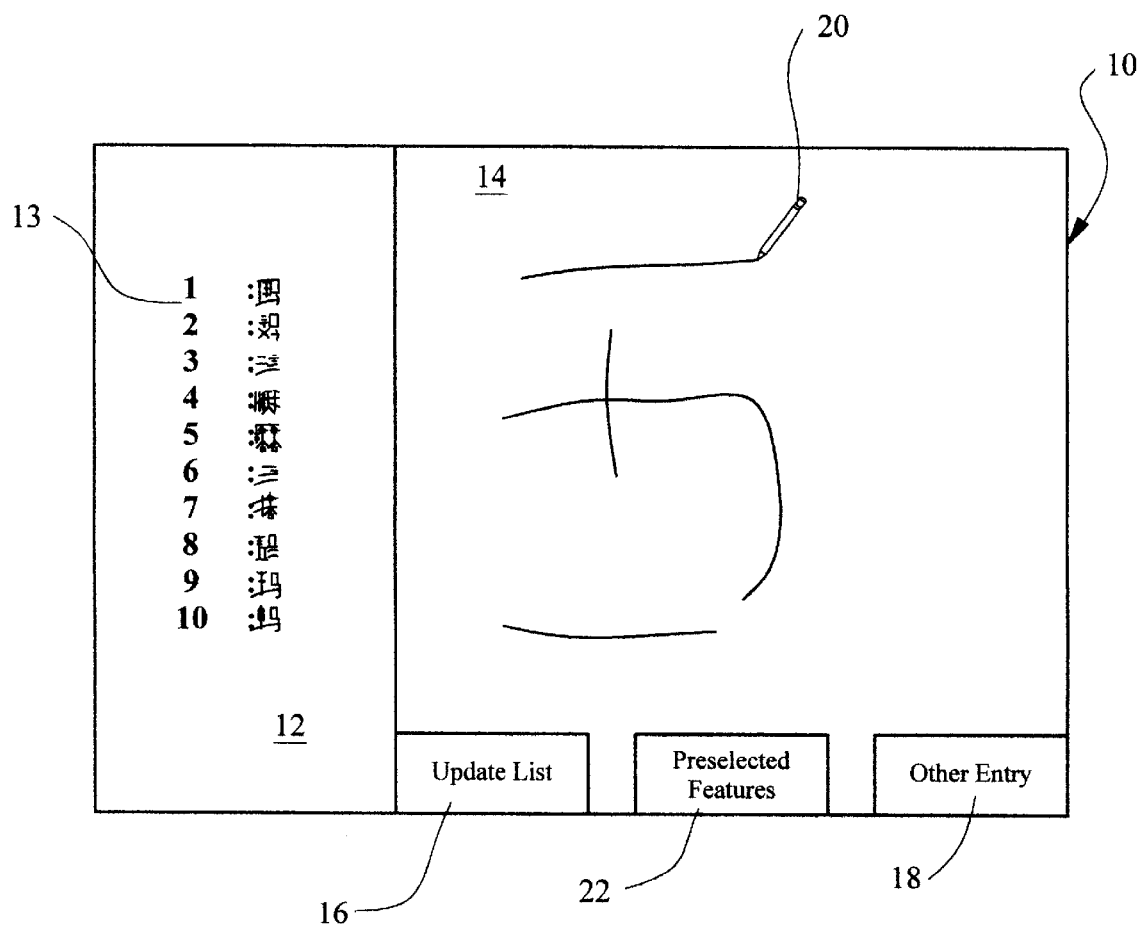
FIG. 1 is a first embodiment of a graphical user interface for correcting speech recognition errors in a character language in accordance with the inventive arrangements.

A graphical user interface 10 in accordance with the inventive arrangements is shown in FIG. 1. The interface 10 comprises a section 12 for displaying a list 13 of alternative characters, a section 14 for drawing the correct character, in whole or in part, a button 16 for initiating an update of the list in section 12 based on the drawing in section 14 and a button 18 for implementing a different correction procedure. The cursor 20 is represented by an arrow in sections 12, 16 and 18, but by a drawing implement in section 20.

If the incorrect character is correctly represented by one of the characters in list 13, the user can select the correct character, for example with the mouse, and it will be substituted for the incorrect character in the transcription. If none of the characters in the list is correct, the user can manipulate the cursor with the mouse to draw at least part of the correct character in section 14. At any time, the user can request an update of the list 13 by activating button 16. Updating can also be automatic, for example responsive to moving the cursor out of section 14. The comprehensive list of characters is filtered by the additional information provided by the drawing and an updated list of characters is presented. If the correct character is in the updated list, the correct character can be selected. If the correct character is not in the updated list, then more features of the correct character can be drawn, for further filtering and updating of the list. This process continues until the correct character is added to an updated list, or the character has been drawn completely.

Figure 2:
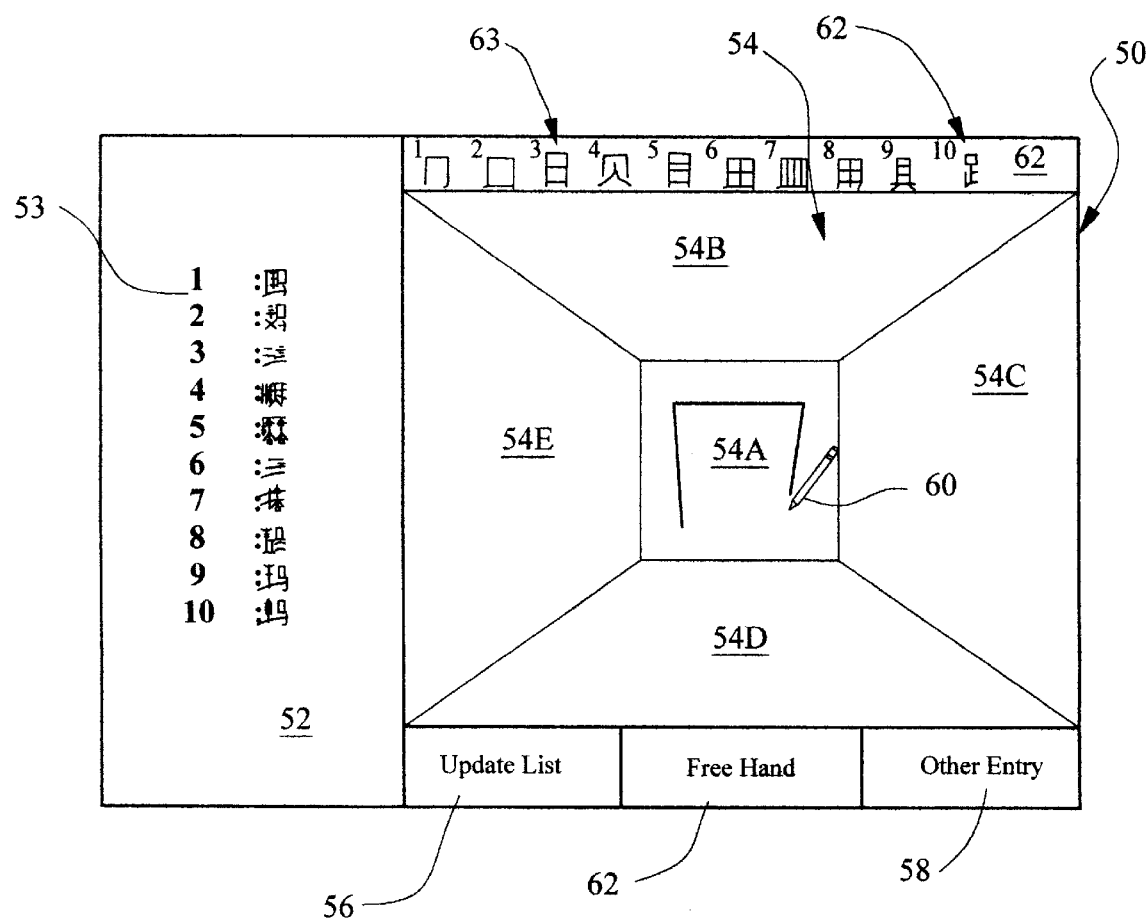
FIG. 2 is a second embodiment of a graphical user interface for correcting speech recognition errors in a character language in accordance with the inventive arrangements.

An alternative graphical user interface 50 in accordance with the inventive arrangements is shown in FIG. 2. User interaction with GUI 50 differs from interaction with GUI 10 in the technique used for drawing the characters. GUI 50 comprises a section 52 with a list of alternative characters 53, a section 54 for drawing the characters, a button 56 for updating the list 53 and a button 58 for initiating an alternative correction technique.

GUI 50 also comprises a section 62 having a list 63 of selectable features from which characters can be created. Section 54 is divided into five zones, designated 54A, 54B, 54C, 54D and 54E, in accordance with the five zones which are normally employed to write the characters. Instead of drawing only freehand, as with GUI 10, various features can be selected from the list 63 and pasted into different ones of the zones by manipulating the cursor with the keyboard or the mouse, or both. The cursor 60 is in the form of a drawing implement when in section 54. The GUI can be implemented to permit only dragging and pasting of the features, or to enable freehand drawing as well. Use of the preformed features can speed recognition during the correction process. As with GUI 10, the list 63 can be updated by filtering the comprehensive list of characters with the additional information represented by the selected and pasted features, until the correct character is recognized. Updating can also be automatic, for example responsive to moving the cursor out of section 54.

GUI 10 and GUI 50 can be used mutually exclusively, or as alternatives to one another in the same speech application. When GUI 10 and GUI 50 are used alternately, GUI 10 can be provided a with button 22 to access GUI 50 and GUI 50 can be provided with a button 62 to access GUI 10. Buttons 22 and 62 are unnecessary if GUI 10 and GUI 50 are not selectable alternatives.

Figure 3:
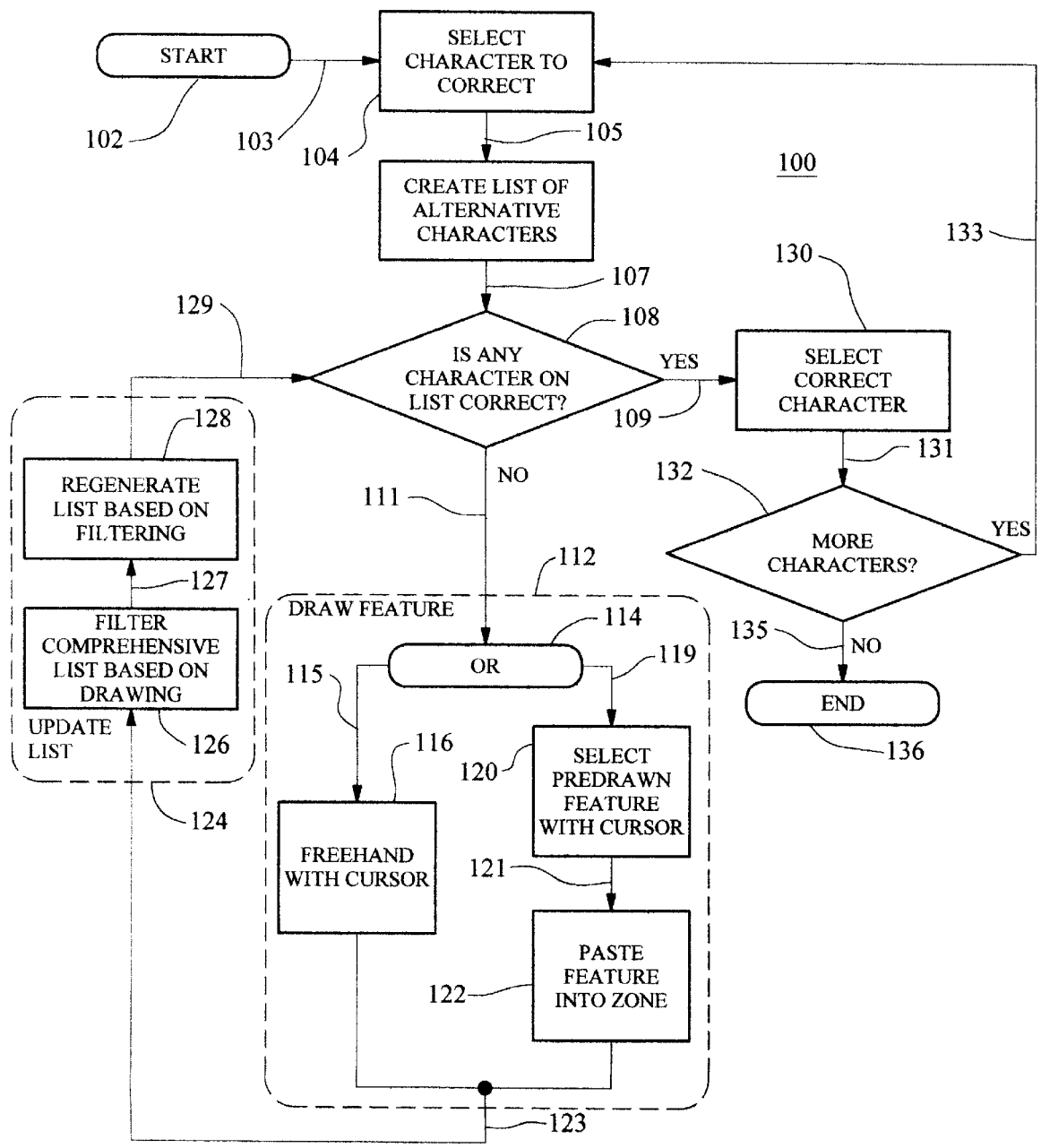
FIG. 3 is a flow chart of a method for correcting speech recognition errors in a character language in accordance with the inventive arrangements.

In the case of either or both GUI 10 and GUI 50, as well as other appropriate graphical user interfaces, a method for correcting errors of a speech recognition application in natural speech recognition of words or phrases represented by characters, in accordance with the inventive arrangements, is described by the flow chart 100 shown in FIG. 3. The method represented by the flow chart 100 in FIG. 3 assumes that a passage text has already been dictated and that one or more incorrect characters have been identified in the transcript. From start block 102, path 103 leads to the step of block 104, in accordance with which one of the incorrect characters is selected for correction. Alternatively, the incorrect characters can be presented in order, for example in order of dictation, or in accordance with any other user appropriate convenient criteria. It should be appreciated that each character represents a word or phrase in its entirety Once a character has been selected for correction, path 105 leads to the step of block 106, in accordance with which the list of alternative characters is created, for example based on selections of the speech application.

After the list has been created, path 107 leads to decision block 108. In accordance with the step of block 108, the user observes the list of alternatives to determine if one of the characters in the list is the correct character. If the correct character is not in the list, the method branches on path 11 to the step of block 112, in accordance with which a feature of the character is drawn. In accordance with the two embodiments shown in FIGS. 1 and 2, two branches are shown in block 112 leading from OR block 114. One or both of these branches will be utilized, depending upon the desired implementation. Path 115 leads to the step of freehand drawing with the cursor, by manipulating the keyboard or mouse, or both, in accordance with block 116. Path 119 leads to the step of selecting a predrawn feature with the cursor in accordance with block 120. Thereafter, path 121 lead to the step of pasting the feature into one of the zones in the drawing section in accordance with block 122. Alternative movement back and forth between the drawing alternatives explained in connection with FIGS. 1 and 2 has been omitted for purposes of clarity, and in any event, is not required.

Irrespective of the drawing implementation, path 123 leads to the step of updating the list in accordance with block 124. Updating the list can comprise two steps, the first of which is the step of filtering a comprehensive list of characters based on the information in the drawing, in accordance with block 126. Thereafter, path 127 leads to the step of regenerating the list in accordance with block 128, based on the filtering step of block 126. Path 129 leads back to decision block 129. The continuous path of blocks 108, 112 and 124 continues to be traversed until the answer to decision block 108 is yes. It will be appreciated that the steps of blocks 112 and 124 will be unnecessary if the answer to decision block 108 is yes in the first instance.

When the answer to decision block 108 is yes, the method branches on path 109 to block 130, in accordance with which the correct character is selected from the list. When the correct character has been selected, path 131 leads to decision block 132, which asks whether more characters need to be corrected. If the answer is yes, the method branches on path 133 back to the step of block 104, in accordance with which another character is selected for correction. If the answer to decision block 132 is no, the method branches on path 135 to the step of block 136, in accordance with which the method is terminated.

Certain aspect of the method can be advantageously implemented by voice commands as well as by use of the keyboard and mouse. These aspects include, for example, entering the correction mode of the speech application; selecting a character to be corrected; selecting characters from the list 13, 53 of alternatives; selecting features from the list 63 of predrawn features; pasting predrawn features into selected ones of the zones 54A, 54B, 54C, 54D, 54E; updating the list of alternatives; activating the other entry feature buttons 18, 58; moving between the alternative graphical user interfaces 10, 50 for drawing the characters, if implemented; and, terminating the correction method.

Another feature which has been omitted from the drawings for purposes of clarity is that the drawing section can be size adjustable, up to as large as filling the entire screen, which can allow the user to more easily use the mouse to draw characters or features.

The user interfaces in accordance with the inventive arrangements have the advantage of being quickly and easily learnable by anyone who can speak and write the characters that they want to dictate. Although recognition of Chinese language characters has been used for the purpose of explaining the inventive arrangements, the methods taught herein are not so limited. The method is also appropriate for other contexts, for example dictating mathematical formulae utilizing graphical symbols. The method taught herein can also work for users having computers with pen interfaces, although such expensive options as pens, pads or special keyboards are advantageously not necessary.

The inventive arrangements advantageously include methods and user interfaces that use multi-modal error correction input, combining voice command, keyboard and mouse or pen.

What is claimed is:

1. A method for correcting errors of a speech recognition application in natural speech recognition of words or phrases represented by characters, comprising the steps of:

selecting a character corresponding to an incorrectly recognized spoken word or phrase in a transcript of dictated text;

observing a list of alternative characters;

replacing said incorrect character in said transcript with one of said alternative characters, if said one of said alternative characters correctly represents said incorrectly recognized word or phrase; and, drawing at least some features of a character correctly representing said incorrectly recognized word or phrase in said transcript by moving a cursor, if none of said alternative characters in said list correctly represents said spoken word or phrase.

2. The method of claim 1, further comprising the step of updating said list of alternative characters responsive to said drawing step.

3. The method of claim 1, further comprising the steps of:

filtering a comprehensive list of said characters based on said drawing step;

regenerating said list of alternative characters based on said filtering step; and, repeating said observing and replacing steps.

4. The method of claim 3, further comprising the steps of:

repeating said drawing step if none of said alternative characters in said regenerated list correctly represents said spoken word or phrase; and, repeating said filtering, regenerating, observing and replacing steps.

5. The method of claim 1, wherein said drawing step comprises the steps of:

selecting at least one predrawn character feature from a list of said features; and, pasting said at least one selected feature into at least one of a plurality of predefined zones by which said characters are defined.

6. The method of claim 5, further comprising the step of updating said list of alternative characters responsive to said selecting and pasting steps.

7. The method of claim 5, further comprising the steps of:
filtering a comprehensive list of said characters based on said selecting and pasting steps;
regenerating said list of alternative characters based on said filtering step; and,
repeating said observing and replacing steps.

8. The method of claim 7, further comprising the steps of:
repeating said selecting and pasting steps if none of said alternative characters in said regenerated list correctly represents said spoken word or phrase; and,
repeating said filtering, regenerating, observing and replacing steps.

9. The method of claim 1, comprising the steps of:
displaying said list in a first part of a graphical user interface (GUI) of said speech recognition application; and,
drawing said at least some features in a second part of said GUI.

10. The method of claim 9, further comprising the step of changing said cursor in appearance as said cursor is moved between said first and second parts of said GUI.

11. The method of claim 9, further comprising the step of automatically initiating said updating step when said cursor is moved out of said second part of said GUI.

12. The method of claim 1, wherein at least one of said steps of selecting, replacing, and drawing is initiated by a voice command.

13. A method for correcting errors of a speech recognition application in natural speech recognition of words or phrases represented by characters, comprising the steps of:
selecting a character corresponding to an incorrectly recognized spoken word or phrase in a transcript of dictated text;
observing a list of alternative characters;
replacing said incorrect character in said transcript with one of said alternative characters, if said one of said alternative characters correctly represents said incorrectly recognized word or phrase;
drawing at least some features of a character correctly representing said incorrectly recognized word or phrase in said transcript by moving a cursor, if none of said alternative characters in said list correctly represents said spoken word or phrase;
updating said list of alternative characters responsive to said drawing step; and,
repeating said replacing, drawing and updating steps until a character correctly representing said word or phrase is selected from said updated list.

14. The method of claim 13, wherein said updating step comprises the steps of:
filtering a comprehensive list of said characters based on said drawing step; and,
regenerating said list of alternative characters based on said filtering step.

15. The method of claim 14, wherein said drawing step comprises the steps of:
selecting at least one predrawn character feature from a list of said features; and,
pasting said at least one selected feature into at least one of a plurality of predefined zones by which said characters are defined.

16. The method of claim 13, wherein said drawing step comprises the steps of:
selecting at least one predrawn character feature from a list of said features; and,
pasting said at least one selected feature into at least one of a plurality of predefined zones by which said characters are defined.

17. The method of claim 13, comprising the steps of:
displaying said list in a first part of a graphical user interface (GUI) of said speech recognition application;
selecting said at least one predrawn character from a second part of said GUI; and,
pasting said at least one feature into a third part of said GUI.

18. The method of claim 17, further comprising the step of changing said cursor in appearance at least within said third part of said GUI.

19. The method of claim 17, further comprising the step of automatically initiating said updating step when said cursor is moved out of said third part of said GUI.

20. The method of claim 13, wherein at least one of said steps of selecting, replacing, drawing, and updating is initiated by a voice command.

21. A graphical user interface (GUI) embodied in a programmed routine set of instructions for correcting errors of a speech recognition application in natural speech recognition of words or phrases represented by characters, said GUI comprising:
a first section for displaying a list of alternative characters for replacing incorrect characters in a transcript of dictated text;
a second section for drawing at least some features of a character correctly representing said incorrectly recognized word or phrase in said transcript by moving a cursor; and,
means for providing a cursor with different appearances in said first and second sections respectively; and,
means for initiating regeneration and redisplay of said list responsive to information drawn in said second section.

22. The GUI of claim 21, wherein said initiating means comprises an activatable icon displayed on said GUI.

23. The GUI of claim 21, wherein said initiating means is responsive to movement of said cursor out of said second section.

24. The GUI of claim 21, comprising a third section for displaying a list of character features which can be selected and pasted into said second section.

25. The GUI of claim 24, wherein said second section is divided into a plurality of zones into which said selected character features can be pasted.

26. The GUI of claim 25, wherein said initiating means comprises an activatable icon displayed on said GUI.

27. The GUI of claim 25, wherein said initiating means is responsive to movement of said cursor out of said second section.

28. The GUI of claim 21, responsive to voice commands, keyboard commands, mouse commands, pen commands, or pad commands.

* * * * *